(12) United States Patent
Brown et al.

(10) Patent No.: US 10,872,145 B2
(45) Date of Patent: Dec. 22, 2020

(54) SECURE PROCESSOR-BASED CONTROL PLANE FUNCTION VIRTUALIZATION IN CLOUD SYSTEMS

(71) Applicant: International Business Machines Corporation, Armonk, NY (US)

(72) Inventors: Victor Brown, Chesapeake, VA (US); Jeb R. Linton, Manassas, VA (US)

(73) Assignee: International Business Machines Corporation, Armonk, NY (US)

(*) Notice: Subject to any disclaimer, the term of this patent is extended or adjusted under 35 U.S.C. 154(b) by 171 days.

(21) Appl. No.: 15/793,432

(22) Filed: Oct. 25, 2017

(65) Prior Publication Data

US 2019/0121960 A1 Apr. 25, 2019

(51) Int. Cl.
*G06F 21/53* (2013.01)
*G06F 21/57* (2013.01)
(Continued)

(52) U.S. Cl.
CPC .......... *G06F 21/53* (2013.01); *G06F 9/45558* (2013.01); *G06F 9/5077* (2013.01);
(Continued)

(58) Field of Classification Search
CPC ...... G06F 21/53; G06F 21/74; G06F 9/45558; G06F 9/5077; G06F 21/57;
(Continued)

(56) References Cited

U.S. PATENT DOCUMENTS

| 7,224,668 | B1 * | 5/2007 | Smethurst | ........... H04L 63/1458 |
| | | | | 370/229 |
| 7,990,993 | B1 * | 8/2011 | Ghosh | ................... H04L 45/025 |
| | | | | 370/428 |

(Continued)

OTHER PUBLICATIONS

Subramanyan et al., "A Formal Foundation or Secure Remote Execution of Enclave", pp. 1-16, 2017.*

(Continued)

*Primary Examiner* — Robert B Leung
*Assistant Examiner* — Thomas Ho
(74) *Attorney, Agent, or Firm* — Jeffrey S. LaBaw; David H. Judson

(57) ABSTRACT

A secure processor-based enclave is used to protect to one or more software defined control functions or elements in a cloud environment, such as a hyperconverged cloud that includes compute nodes. One or more secure enclave(s) are instantiated within the environment. A control plane, such as an NFV-based control plane element, is hosted within the secure enclave, which itself is instantiated within may be virtualized or containerized. The control plane has an associated data plane, whose elements are across one or more of the compute nodes. One or more APIs provide connectivity between the control plane, and the various data plane elements that are located external to the secure enclave. The NFV-based control plane provides configuration information (e.g., a routing table) to the distributed data plane through the APIs. By hosting the control plane securely using in-memory workload protection, the approach insures (Continued)

integrity at load time, and it protects against compromise in real-time, e.g., by privileged attackers or other system processes.

24 Claims, 5 Drawing Sheets

(51) Int. Cl.
*G06F 9/455* (2018.01)
*H04L 12/715* (2013.01)
*G06F 9/50* (2006.01)
*G06F 21/74* (2013.01)
*H04W 28/12* (2009.01)
*H04L 12/24* (2006.01)
*H04L 29/06* (2006.01)

(52) U.S. Cl.
CPC .............. *G06F 21/57* (2013.01); *G06F 21/74* (2013.01); *H04L 41/0893* (2013.01); *H04L 45/64* (2013.01); *H04W 28/12* (2013.01); *G06F 2009/45587* (2013.01); *H04L 41/5096* (2013.01); *H04L 63/20* (2013.01)

(58) Field of Classification Search
CPC ....... G06F 2009/45587; H04L 41/0893; H04L 45/64; H04L 41/5096; H04L 63/20; H04W 28/12
See application file for complete search history.

(56) References Cited

U.S. PATENT DOCUMENTS

| 8,438,631 | B1 | | 5/2013 | Taylor et al. | |
|---|---|---|---|---|---|
| 8,448,238 | B1 | | 5/2013 | Gupta et al. | |
| 8,832,465 | B2 | * | 9/2014 | Gulati | ................... G06F 21/575 713/192 |
| 9,442,752 | B1 | * | 9/2016 | Roth | ................... G06F 9/45558 |
| 9,578,008 | B2 | | 2/2017 | Sood et al. | |
| 2003/0225995 | A1 | * | 12/2003 | Schroter | ................. H04L 69/12 712/28 |
| 2005/0050136 | A1 | * | 3/2005 | Golla | ...................... H04L 45/28 709/200 |
| 2016/0117265 | A1 | * | 4/2016 | McKeen | ............. G06F 12/1416 711/102 |
| 2016/0337329 | A1 | * | 11/2016 | Sood | ....................... H04L 63/08 |
| 2016/0373474 | A1 | * | 12/2016 | Sood | .................... H04L 63/1425 |
| 2018/0114012 | A1 | * | 4/2018 | Sood | ....................... G06F 21/53 |
| 2018/0287966 | A1 | * | 10/2018 | Kamath | ............... G06F 9/45558 |

OTHER PUBLICATIONS

Martinussin, "Introduction to Software Defined Network (SDN)", Apr. 18, 2013, 1-43.*
Adamski, Jul. 5, 2018, "Overview of Intel SGX, part 1 SGX Internals", https://blog.quarkslab.com/overview-of-intel-sgx-part-1-sgx-internals.html, pp. 1-12.*
Nov. 30, 2016, "Data Plane Development Kit Programmer's Guide" Release 16.07.2, pp. 1-216.*
Mandt et al., Azimuth Security, Aug. 23, 2016, "Demystifying the Secure Enclave Processor" pp. 1-41.*
Aderholdlt et al., Oak Ridge National Laboratory, Dec. 2014, "Multi-Tenant Isolation via Reconfigurable Networks" pp. 1-21.*
Intel, "Understanding and Improving Performance in Network Functions Virtualization Environments," White Paper, published, 2016.
Borcoci, "Control Plane Scalability in Software Defined Networking," Apr. 25, 2014.
Anonymous, "Method and apparatus for event-driven software distribution in a cloud-computing infrastructure," IPCOM000208828D, ip.com, Jul. 19, 2011.
Anonymous, "System and Method for Elastic Containerization of Software Defined Control Plane for a Software as a Service (SaaS) Offering," IPCOM000240513D, ip.com, Feb. 4, 2015.
Wells et al, "Structure for Network Functions Virtualization Infrastructure and Applications," IPCOM000250701D, ip.com, Aug. 23, 2017.

* cited by examiner

SECURE PROCESSOR-BASED CONTROL PLANE FUNCTION VIRTUALIZATION IN CLOUD SYSTEMS

BACKGROUND OF THE INVENTION

Technical Field

This disclosure relates generally to data processing systems in a data center operating environment.

Background of the Related Art

A well-known information technology (IT) delivery model is cloud computing, by which shared resources, software and information are provided over the Internet to computers and other devices on-demand. Cloud computing significantly reduces IT costs and complexities while improving workload optimization and service delivery. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Within a cloud computing environment, it is also well-known to group multiple IT components, such as servers, storage devices, etc., into a single computing package to produce a so-called converged infrastructure. More recently, this notion has been expanded further to provide for hyper-converged infrastructure (HCI), which refers to a fully software-defined infrastructure in which all elements are virtualized. These hyperconverged solutions enable a public cloud-like experience through on-premises infrastructure with virtualization and automation capabilities. They provide a combination of reliable storage, fast networks, scalability and extremely powerful computing in modular, scalable building blocks. When needed, it is easy to grow the cluster by adding nodes. A commercially-available solution of this type is IBM® Hyperconverged Systems powered by Nutanix is a hyper-converged infrastructure (HCI) solution that combines Nutanix Enterprise Cloud Platform software with IBM Power® Systems. The integrated solution targets demanding transactional and cognitive analytics workloads with an infrastructure that is easy to manage and simple to scale.

In current hyperconverged cloud solutions, networking is software-defined, taking the form of Network Function Virtualization (NFV) control plane functions that are not tied to specialized hardware, but rather act as redundant highly-available virtualized or containerized elements. These may consist of basic routing/switch control plane functions, load balancing, firewall, and/or more complex higher-layer network capabilities, such as next-generation firewalls. In operation, they provide configuration information to a highly-distributed data plane, e.g., through a set of common APIs. In current systems, however, these critical functions are not necessarily provided with any special assurance of integrity or resistance to privileged attack, thus enabling a privileged system-level attacker or compromised process to cause system-wide compromises or outages, e.g., by attacking the network control plane functions.

There remains a need to address this problem.

BRIEF SUMMARY

A secure processor-based enclave is used to protect to one or more software defined control functions or elements in a cloud environment, such as a hyperconverged cloud that includes compute nodes. One or more secure enclave(s) are instantiated within the environment. A control plane, such as an NFV-based control plane element, is hosted within the secure enclave, which may be virtualized or containerized. The control plane has an associated data plane, whose elements are across one or more of the compute nodes. One or more APIs provide connectivity between the control plane, and the various data plane elements that are located external to the secure enclave. The NFV-based control plane provides configuration information (e.g., a routing table) to the distributed data plane through the APIs. By hosting the control plane securely using in-memory workload protection, the approach insures integrity at load time, and it protects against compromise in real-time, e.g., by privileged attackers or other system processes that may be malicious.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
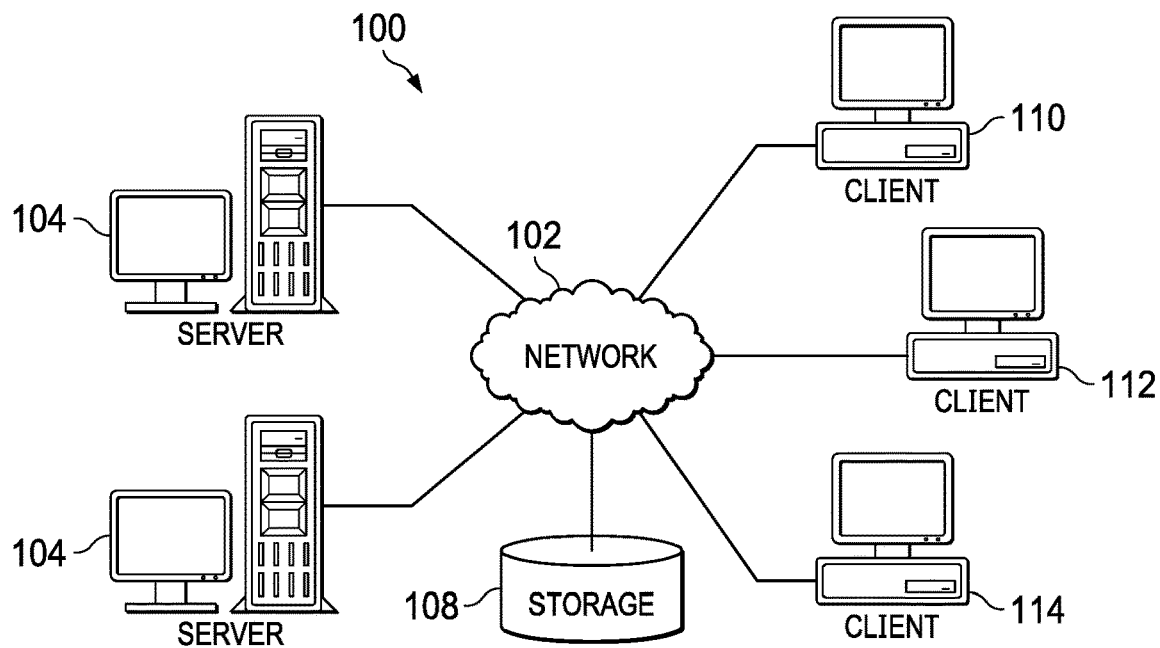
FIG. 1 depicts an exemplary block diagram of a distributed data processing environment in which exemplary aspects of the illustrative embodiments may be implemented.
Figure 2:
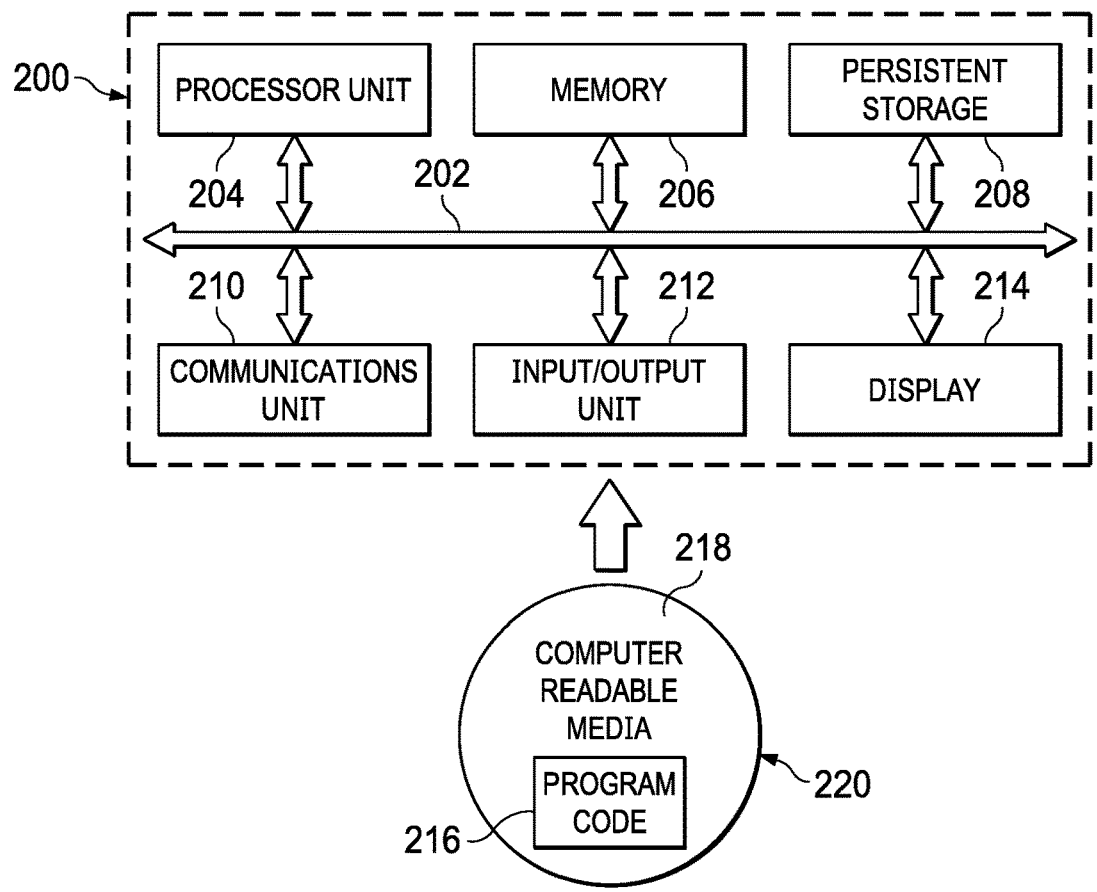
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
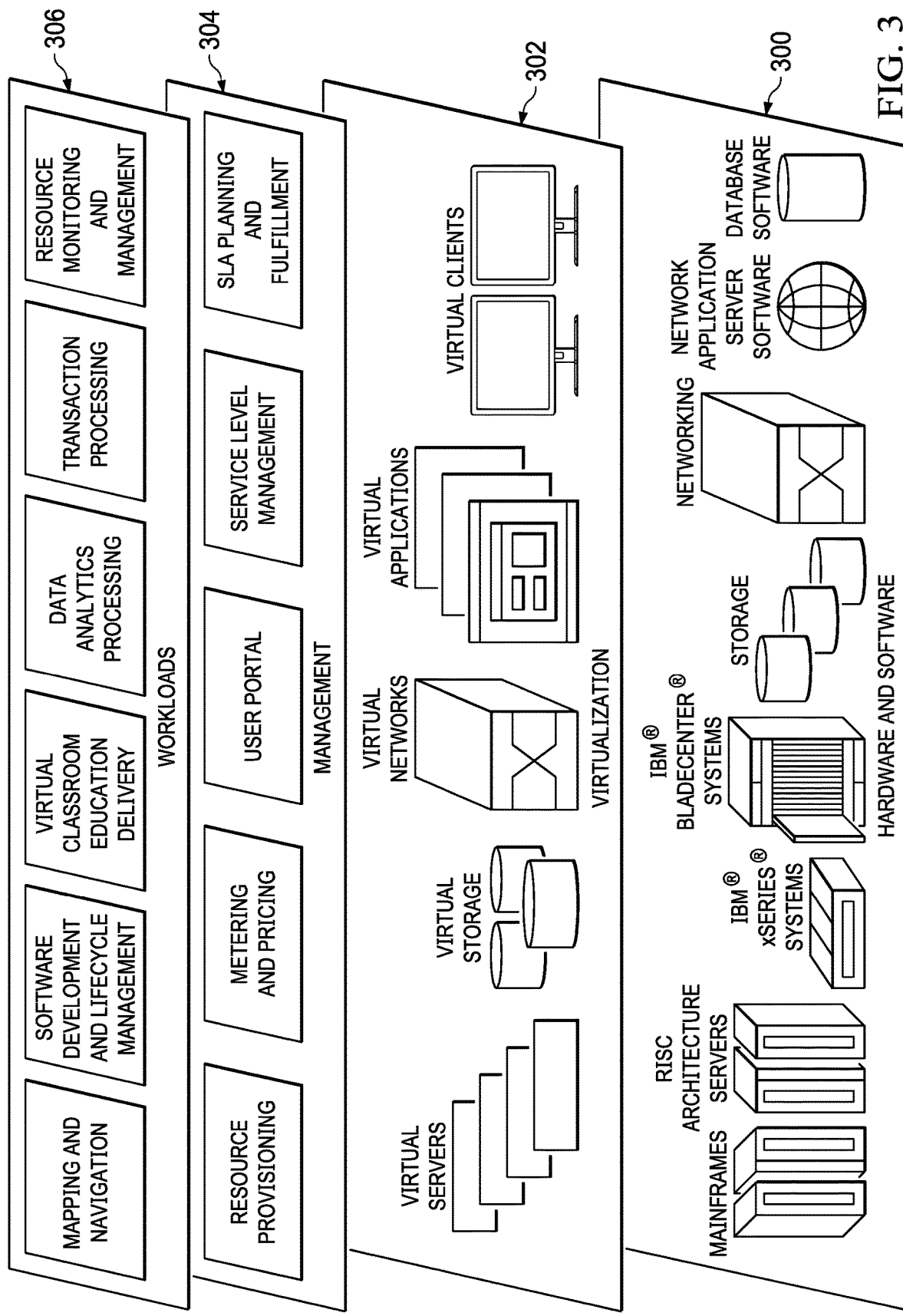
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Most cloud-based services available today are delivered through either bare metal or virtual machines (VMs), however, "container" technologies may also be used. Bare metal environments are those wherein applications are installed, run, and delivered from a base of dedicated cloud infrastructures and OS platforms. Such environments use dedicated and specific hardware and operating system configurations. A virtual machine, in contrast, is machine is a complete guest host running inside of a host system. When virtual machines are used, applications are installed, packaged, and run under the control of a hypervisor, which virtualizes the hardware environment. Containers, on the other hand, provide an operating environment wherein only the essential parts of the application (sometimes referred to as cloud services) and its dependencies are included, and there can be multiple containers running within a single instance of an operating system, such as Linux. Docker is a virtualization platform that shares a single Linux kernel with all running instances (called containers). A single Docker container is lightweight, as it is running on a shared kernel, making efficient use of available resources. Containers are used extensively by many next-generation cloud Platform as a Service (PaaS) developers. Thus, for example, and without limitation, IBM® Bluemix™ is a PaaS cloud platform that uses IBM Containers to run Docker containers. Because a Docker container runs on the existing operating system and shared binaries, it is more compact than a VM; thus, a container solution is often faster and have less memory requirements.

Figure 4:
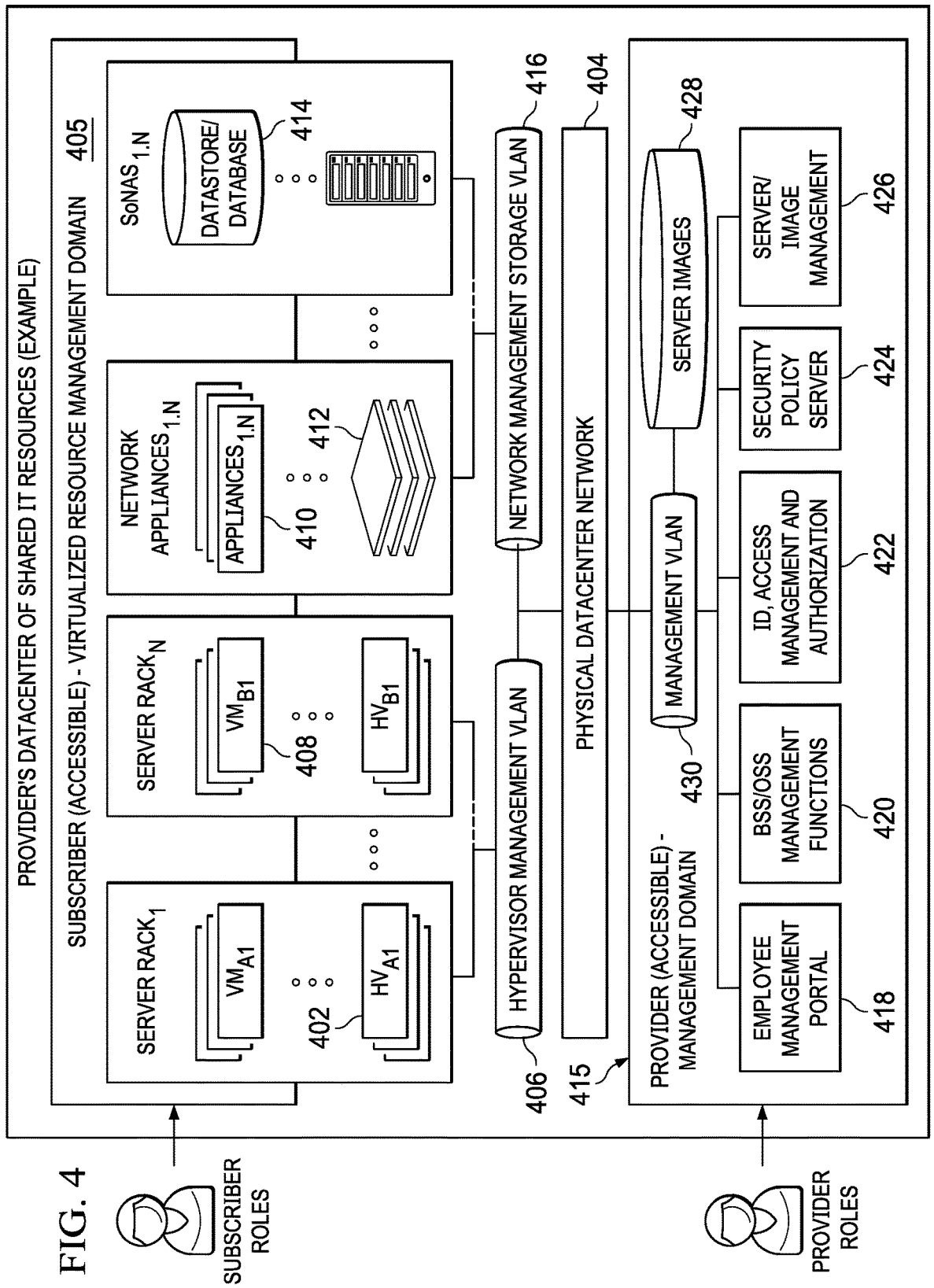
FIG. 4 illustrates an exemplary operating environment in which a network-based appliance may be used to facilitate deployment of one or more cloud-based offerings.

FIG. 4 illustrates a typical IT infrastructure that supports VM-based virtualization of resources and in which the below-described techniques of this disclosure may be implemented in one embodiment. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine or container-based hosting environment that comprises host machines (e.g., servers or like physical machine computing devices) connected via a network and one or more management servers. Typically, the physical servers are each adapted to dynamically provide one or more virtual machines or containers using virtualization technology, such as VMware ESX/ESXi or Docker.

In a non-limiting implementation, representative platform technologies are, without limitation, IBM System x® servers with VMware vSphere 4.1 Update 1 and 5.0.

It is also known in the art to configure or provision cloud architectures such as described above to include mechanisms and systems that operate generally to gather (or otherwise obtain from other data sources) information about available cloud platforms, topologies and capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others.

Cloud application packages may be deployed using platform-as-a-service (PaaS) infrastructure, such as the IBM® Cloud open cloud management platform (also known as SmartCloud® Orchestrator), or IBM® Bluemix.™ The cloud computing environment may also include various deployment and management tools. For example, IBM Cloud includes IBM® Cloud Manager with OpenStack. Cloud Manager is a self-service portal for simplified cloud management for the cloud end user. Cloud Manager with OpenStack enables the user to work with virtual appliances and workloads focusing on the end user's perspective, rather than the IT or systems administrator's perspective. Self-service capabilities simplify the process of executing many common public or private cloud operations such as provisioning and de-provisioning servers (a process known as deploying), drafting and cloning deployments, taking deployment snapshots, starting up and shutting down servers, and resizing existing servers.

Protecting Data-In-Use Using Secure Enclaves

The following provides additional background details for the subject matter of this disclosure.

Digital data sometimes is characterized as being in one of three stages: data-in-use, data-in-motion, and data-at-rest. Data-in-use refers to data in computer memory. Because of its nature, data-in-use is of increasing concern to businesses, government agencies and other institutions. In particular, data-in-use (i.e., in memory) often contains sensitive data including, without limitation, digital certificates, encryption keys, intellectual property (software algorithms, design data), and personally identifiable information. Thus, compromising data-in-use enables access to encrypted data-at-rest and data-in-motion.

Data-in-use typically often is protected in one of several ways. Encryption, which prevents data visibility in the event of its unauthorized access or theft, is commonly used to protect data-in-motion and data-at-rest, and it is increasingly recognized as a preferred method for protecting data-in-use as well. To this end, there have been multiple projects that propose or provide solutions to encrypt memory. Thus, for example, it is known to encrypt memory such that only the user program can access it; this is achieved via a key that is placed in a special hardware location at the processor side and that, for each memory read or write, can be used to decrypt or encrypt the data. Another approach to protecting data-in-use is CPU-based key storage. In this approach, operating system kernel patches modify the operating system so that CPU registers are used to store encryption keys in lieu of holding encryption keys in RAM. In particular, the keys are held inside the CPU rather than in RAM so that data-at-rest encryption keys are protected against attacks that might otherwise compromise encryption keys in memory.

Still another approach to protecting data-in-use is an "enclave," which are private regions in memory. Enclave data is encrypted while in RAM but available as clear text inside the CPU and CPU cache. An enclave approach differs from simply memory encryption in that it uses special registers and circuits that sit between the memory unit and the processor and that hold the key necessary to decrypt/encrypt the data from/to memory, and preferably no other place (including the operating system) stores the key. Special atomic instructions ensure that these registers are the only place where the key is stored. Commercially-available examples of this approach include Intel Software Guard Extensions (SGX), IBM Power9 SMF, and the earlier IBM SecureBlue++ architectures. SGX, for example, is a set of instructions that allows user-level code to allocate an enclave, which unlike normal process memory, is also protected from processes running at higher privilege levels. In a typical solution of this type, a "secure" processor includes a CPU core in which secure executables and data are visible in the clear, but only when the core is executing the secure executable. Prior to such execution, the secure executable code and data (collectively a secure object) are stored in an associated external memory in an encrypted form such that the code and data are not visible to other software or other such secure objects. The secure executable code and data also are not visible as they are transferred from the memory to the CPU core. An encryption key for the secure object is generated or provided to a management module, and the secure object is encrypted under this encryption key. At run-time, various control techniques are used to enable the secure object's sensitive information to be decrypted on the path from external memory to the CPU and encrypted path from the CPU to the external memory. Further details of this process may be found, for example, in U.S. Pat. Nos. 8,578,175 and 8,954,752, the disclosures of which are incorporated herein by reference.

Secure Processor-Based Control Plane Function Virtualization for Cloud Systems

With the above as background, the techniques of this disclosure are now described.

As will be seen, the techniques herein leverage developments in communications networks known as Software Defined Networks (SDN) and Network Function Virtualization (NFV). SDN and NFV use IT cloud architectures to split communications hardware from software, breaking the traditional network equipment architectural model where network function is implemented as an appliance comprising both hardware and software, e.g., from one vendor. Instead of a single network appliance, with SDN and NFV, the switching hardware is commoditized, and the network software is separated, virtualized and deployed in the cloud, thereby decreasing costs and making network function faster and easier to deploy and dynamically modify and scale.

According to this disclosure, a secure processor-based enclave and associated in-memory protection is used to protect to one or more software defined control functions or elements in a cloud environment, such as a hyperconverged cloud. The software defined function may be of varied type, e.g., a network function, a storage function, a power function, an orchestration function, and so forth.

In a preferred embodiment, which is now described, the software defined function is a networking function and, in particular, a control plane. In routing, a control plane is operative to determine network topology, and to build and maintain a routing table that defines how packets are to be routed. A routing table typically contains a list of destination addresses and outgoing interfaces associated with these addresses. Control plane functions include managing routing protocols, defining various quality of service (QoS), and so forth. The control plane is distinguished from the data (or forwarding) plane, which typically is distributed, and that is used to forward network traffic along one or more paths to destinations according to the information provided in the routing table by the control plane. In some routing architectures, the data plane has its own database that is populated with the routing table provided by the control plane. The data plane has the actual responsibility for receiving and processing the data packets.

The approach herein is to provide for Network Function Virtualization (NFV) control plane functions that are not tied to specialized hardware, but rather act as redundant highly-available virtualized or containerized elements. These may consist of basic routing/switch control plane functions, load balancing, firewall, and/or more complex higher-layer network capabilities, such as next-generation firewalls.

Figure 5:
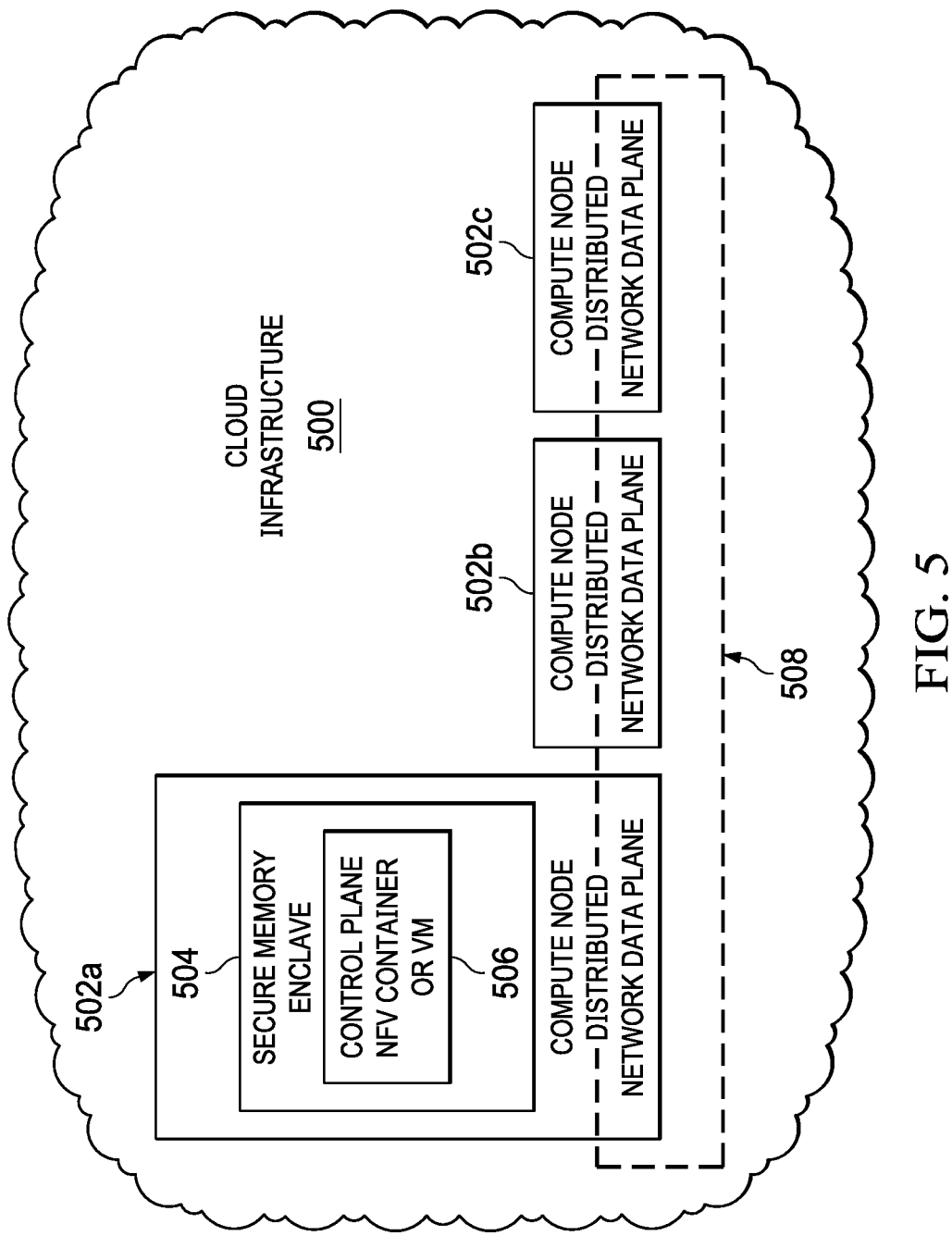
FIG. 5 depicts a hyperconverged cloud infrastructure in which the techniques of this disclosure are implemented.

FIG. 5 depicts a basic implementation scenario. In this embodiment, the cloud infrastructure 500 is a hyperconverged cloud comprising a number of compute nodes 502. The compute nodes may be implemented on virtual machines, on containers, or even on bare metal, as previously described. According to this disclosure, one or more secure enclave(s) 504 are instantiated within the environment in a known manner. Thus, and as described, the secure enclave may be implemented using secure processor-based in-memory data-in-use security mechanisms. As also depicted, a control plane, such as an NFV-based control plane element 506 is hosted within the secure enclave 504 implemented on compute node 502a. In this embodiment, the control plane 506 is hosted and thus isolated within the secure enclave, which itself is instantiated within one of a VM or container. The control plane 506 has associated therewith a data plane 508, whose elements are preferably distributed (as a distributed network data plane) across one or more of the compute nodes. Thus, and as depicted, the data plane 508 has a portion supported on the compute node 502a that supports the virtualized or containerized secure enclave that hosts the control plane, as well as other portions that are supported on the other compute nodes 502b and 502c. Preferably, that portion of the data plane that is supported on compute node 502a does not execute within the secure enclave that hosts the control plane.

Connectivity 510 is provided between the control plane 506 in the secure enclave 504, and the various data plane elements that are located external to the secure enclave. In a preferred embodiment, the connectivity 510 is provided via one or more application programming interfaces (APIs). Preferably, at least one such API is an externalized API such that other network and security functions can be managed or controlled in part via the control plane secured within the enclave. In operation, the NFV-based control plane 506 provides the control and configuration information (e.g., the routing table(s)) to the distributed data plane through these interfaces.

While FIG. 5 depicts the control plane element (the software defined function) hosted within the secure enclave 504 instantiated within a virtual machine or container, an alternative approach is to have the software defined function instantiated as a virtual machine or container inside the secure enclave.

Thus, according to this disclosure, the control plane is hosted securely using in-memory workload protection to both insure integrity at load time and to insure against compromise (of the control plane) in real-time, e.g., by privileged attackers or other system processes that may be malicious. Non-limiting examples of secure memory technology that may provide this protection for the control plane function(s) include Intel SGX and/or IBM Power9 SMF, which as noted above are designed to protect sensitive workloads from this class of attacks. As also noted, the secure enclave provided in this class of secure processor technology may take the form of virtual machines or containers, such as Docker containers. By hosting the control plane in this manner, in-memory protection is applied to one or more Network Function Virtualization (NFV) elements for a hyperconverged Software Defined Network (SDN).

The protected memory enclave can also take advantage of the load-time cryptographic integrity checking provided by the trusted computing base functions, such as Intel TXT and Power Secure Boot. In a representative but non-limiting embodiment, representative NFV functions that are protected in this way include basic Layer 2 or 3 routing and/or switching, firewall functions, and load balancing.

Preferably, the secure enclave takes the form of a container or virtual machine having a limited device tree to minimize internal attack surfaces. To this end, the cloud computing environment comprises a client (tenant)-level partition. The client partition is one in which the client/tenant has sole secure access via known mechanisms, e.g., logging in with a password via SSL. In addition, a separate memory partition is then established as the secure enclave, and the control plane (or elements thereof) placed within (or downloaded to) this latter partition. Once initialized (e.g., via a secure boot process), the partition that hosts the control plane preferably is accessible only via a client application programming interface (API) to the client partition. In other words, preferably commands and data can only be exchanged between the client and the control plane via the client API. In this approach, preferably the API operates in a shared memory region that both the client partition and the partition that hosts the control plane can access.

Figure 6:
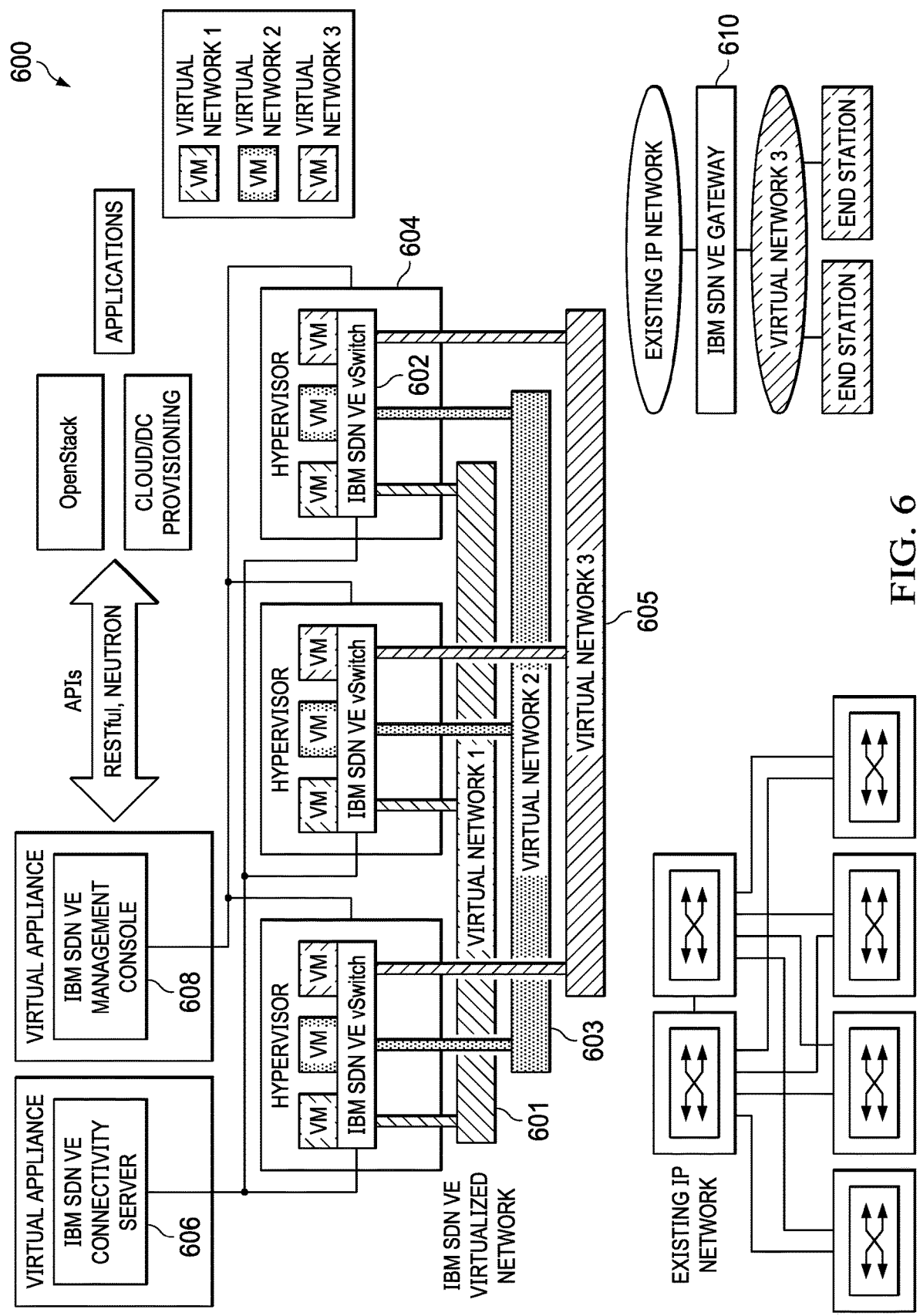
FIG. 6 depicts a representative software defined network in which the secure processor-based enclave approach is used to protect one or more control plane functions.

FIG. 6 depicts an example VM-based SDN implemented in accordance with the techniques of this disclosure. This example is implemented using IBM Software Defined Network for Virtual Environments (SDN VE), a network overlay solution that supplies a complete implementation framework for network virtualization. SDN VE is a multi-hypervisor, server-centric solution comprising multiple components that overlay virtual networks onto any physical network that provides IP connectivity. As depicted, the SDN VE solution 600 is made up of four basic software components that work in combination to provide effective host-based network virtualization. An SDN VE Virtual Switch 602 is software that resides in the hypervisor 604. It serves as the start and end point of each virtual network, and several such networks 601, 603 and 605 are shown. The SDN VE Virtual Switch provides Layer 2 and Layer 3 network virtualization over a UDP overlay, and it implements the data path of the virtual network. The virtual switch also performs control plane functions to support virtual machine (VM) address auto discovery, VM migration and network policy configuration. According to this disclosure, one or more of these control plane functions are hosted within a secure enclave in the manner previously described. A connectivity service 606 disseminates VM addresses to the virtual switches participating in an SDN VE virtual network. The connectivity service software preferably is deployed as a cluster of virtual appliances. A management console 608 is a centralized point of control for configuring the SDN VE. It configures each virtual network, controls policies and disseminates policies to the virtual switches. It also helps administrators manage individual virtual networks. Preferably, the management console software resides on a server as a virtual appliance. Finally, VLAN- and IP-based gateways 610 enable the SDN VE to establish interoperability with networks and servers that are external to the SDN VE environment. For Layer 2 networks, SDN VE provides VLAN-based gateways. For Layer 3 networks, the software provides IP-based gateways.

There are two (2) architectural models for SDN, overlay, and native. In an overlay SDN, the SDN is deployed on top of an existing IP network. In an Openflow SDN, router appliances are replaced with Layer 2 data forwarding switches and network control software that access the Layer 2 switches, e.g., using an OpenFlow communications protocol.

As also noted above, the SDN may be implemented using Docker containers in lieu of the virtual machine approach.

The technique of this disclosure—wherein the control plane is split from the data plane and hosted in a secure enclave and with APIs created to enable restricted communication between the two—provides significant advantages. As has been described, the approach herein uses advanced hardware-rooted in-memory workload protection for one or more control plane functions to both insure integrity at load time and to insure against compromise in real-time by privileged attackers or system processes. Accordingly, a system-level process, or a root user in a hypervisor or operating system, is not able to read and modify the contents of the memory, thereby protecting the critical control plane elements. The approach herein of securing the control plane within a secure enclave in a secure processor thus prevents any system-wide outage or compromise events that might otherwise be obtained (e.g., by an attacker) due to the high level of system function virtualization. As noted, the approach conveniently leverages secure CPU technologies that protect the confidentiality and integrity of the control plane element(s) and data (e.g., the routing table) not only from physical attack but also from all the other software on parts of the system including privileged software, as well as against malware that might otherwise infect privileged software to obtain root privilege. Further, because the APIs necessary to provide connectivity between the NFV control plane functions and the distributed data plane are externalized, third-party networking vendors are enabled to provide additional value-added network and security functions. The secure enclave architecture described here enables these partners to obtain assurance of integrity of their value-added services in addition to the system's native services.

While the approach herein has been described primarily in the context of NFV, this is not a limitation, as the approach of using a secure enclave to host a software defined function may extend to other control functions, including storage management, power management, virtual machine and container orchestration, and combinations thereof.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various data center architectures including simple n-tier architectures, web portals, federated systems, and the like. The herein also may be practiced in a loosely-coupled server (including a "cloud"-based) environment, whether, private, public, or hybrid.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the security manager is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

Having described our invention, what we claim is as follows.

The invention claimed is:

1. A method to protect information in a secure processor-based cloud computing environment, comprising instantiating a secure enclave within the secure processor-based cloud computing environment;

isolating a control plane of a software defined function within the secure enclave such that the control plane is protected from one or more processes running at a high privilege level within the cloud computing environment, the control plane having associated therewith a data plane located external to the secure enclave, the control plane including a routing table, and the data plane including one or more elements that forward traffic according to information in the routing table;

providing connectivity between the control plane isolated within the secure enclave, and the data plane located external to the secure enclave; and executing the control plane of the software defined function from within the secure enclave to provide the information, thereby controlling the data plane elements to route traffic according to the routing table.

2. The method as described in claim 1 wherein the secure enclave is instantiated within one of: a virtual machine, and a container.

3. The method as described in claim 1 wherein the software defined function is instantiated as a virtual machine or container inside the secure enclave.

4. The method as described in claim 1 wherein the software defined function is a virtual function that is one of: a network function, a storage function, a power function, and a virtual machine and container orchestration function.

5. The method as described in claim 4 wherein the network function is one of: a router, a switch, a firewall, and a load balancer.

6. The method as described in claim 1 further including verifying integrity of the secure enclave at a load time of the control plane of the software defined function.

7. The method as described in claim 1 wherein the connectivity is provided via an externalized application programming interface (API) that is inaccessible by the one or more processes.

8. The method as described in claim 7 wherein control data generated by the control plane of the software defined function includes the routing table that is passed via the API to the data plane to facilitate secure network function virtualization (NFV) in a software defined network (SDN).

9. Apparatus to protect information in a secure processor-based cloud computing environment, comprising:
one or more hardware processors;
computer memory holding computer program instructions executed by the hardware processors and configured to:
instantiate a secure enclave within the secure processor-based cloud computing environment;
isolate a control plane of a software defined function within the secure enclave such that the control plane is protected from processes running at a high privilege level within the cloud computing environment, the control plane having associated therewith a data plane located external to the secure enclave, the control plane including a routing table, and the data plane including one or more elements that forward traffic according to information in the routing table;
provide connectivity between the control plane isolated within the secure enclave, and the data plane that is located external to the secure enclave; and
execute the control plane of the software defined function from within the secure enclave to provide the information, thereby controlling the data plane elements to route traffic according to the routing table.

10. The apparatus as described in claim 9 wherein the secure enclave is instantiated within one of: a virtual machine, and a container.

11. The apparatus as described in claim 9 wherein the software defined function is instantiated as a virtual machine or container inside the secure enclave.

12. The apparatus as described in claim 9 wherein the software defined function is a virtual function that is one of: a network function, a storage function, a power function, and a virtual machine and container orchestration function.

13. The apparatus as described in claim 12 wherein the network function is one of: a router, a switch, a firewall, and a load balancer.

14. The apparatus as described in claim 9 wherein the computer program instructions are further configured to verify integrity of the secure enclave at a load time of the control plane of the software defined function.

15. The apparatus as described in claim 9 wherein the computer program instructions configured to provide connectivity are one or more externalized application programming interfaces (APIs) that is inaccessible by the one or more processes.

16. The apparatus as described in claim 15 wherein control data generated by the control plane of the software defined function includes the routing table that is passed via an API to the data plane to facilitate secure network function virtualization (NFV) in a software defined network (SDN).

17. A computer program product in a non-transitory computer readable medium for use in a data processing system to protect information in a secure processor-based cloud computing environment, the computer program product holding computer program instructions executed in the data processing system and configured to:
instantiate a secure enclave within the secure processor-based cloud computing environment;
isolate a control plane of a software defined function within the secure enclave such that the control plane is protected from processes running at a high privilege level within the cloud computing environment, the control plane having associated therewith a data plane located external to the secure enclave, the control plane including a routing table, and the data plane including one or more elements that forward traffic according to information in the routing table;
provide connectivity between the control plane isolated within the secure enclave, and the data plane that is located external to the secure enclave; and
execute the control plane of the software defined function from within the secure enclave to provide the information, thereby controlling the data plane elements to route traffic according to the routing table.

18. The computer program product as described in claim 17 wherein the secure enclave is instantiated within one of: a virtual machine, and a container.

19. The computer program product as described in claim 17 wherein the software defined function is instantiated as a virtual machine or container inside the secure enclave.

20. The computer program product as described in claim 17 wherein the software defined function is a virtual function that is one of: a network function, a storage function, a power function, and a virtual machine and container orchestration function.

21. The computer program product as described in claim 20 wherein the network function is one of: a router, a switch, a firewall, and a load balancer.

22. The computer program product as described in claim 17 wherein the computer program instructions are further configured to verify integrity of the secure enclave at a load time of the control plane of the software defined function.

23. The computer program product as described in claim 17 wherein the computer program instructions configured to provide connectivity are one or more externalized application programming interfaces (APIs) that is inaccessible by the one or more processes.

24. The computer program product as described in claim 23 wherein control data generated by the control plane of the software defined function includes the routing table that is passed via an API to the data plane to facilitate secure network function virtualization (NFV) in a software defined network (SDN).

* * * * *